Figure 1:
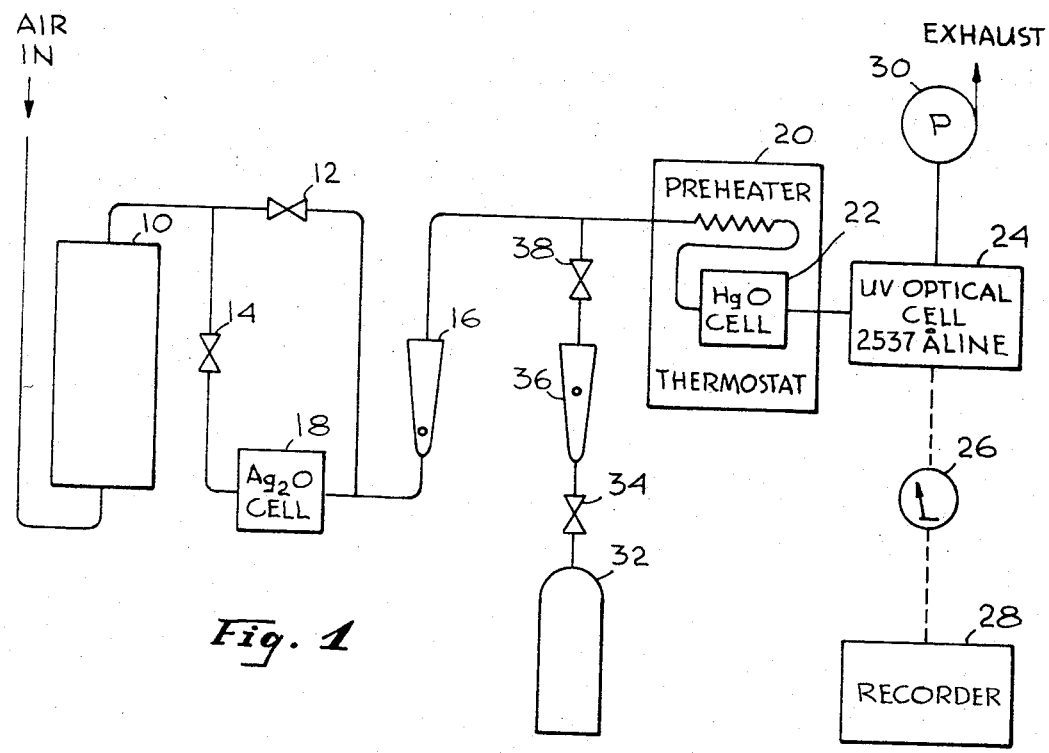

Jan. 7, 1969    R. C. ROBBINS    3,420,636
CARBON MONOXIDE ANALYZER
Filed April 28, 1966

INVENTOR.
ROBERT C. ROBBINS
BY Samuel Lindenberg
Arthur Freilich
ATTORNEYS

United States Patent Office 3,420,636
Patented Jan. 7, 1969

3,420,636
CARBON MONOXIDE ANALYZER
Robert C. Robbins, Menlo Park, Calif., assignor to Stanford Research Institute, Menlo Park, Calif., a corporation of California
Filed Apr. 28, 1966, Ser. No. 546,053
U.S. Cl. 23—254          9 Claims
Int. Cl. G01n 31/00; G01n 21/26

This invention relates to apparatus for the detection and quantiative measure of gases in low concentrations and more particularly to an improved carbon monoxide detector.

Instruments of the type used for the detection and measurement of gases in low concentrations usually work on the principle of drawing a known and an unknown gas sample through two parallel detection loops which may include a filter unit, a preheater coil, a reaction chamber, and a photometric measuring cell. Each of the parallel reaction chambers contain a charge of activated mercuric oxide which reacts with carbon monoxide (or some other gaseous reducing material which is being measured) to generate mercury vapor. The photometric measuring cells detect the difference in mercury concentration between the unknown sample and the known sample and register this as a reading on a galvanometer. Alternative to this, the system may have a single detection loop through which the known and unknown gas samples are alternatively drawn.

One of the problems with this type of instrument is that the cell which contains the activated mercuric oxide also produces a very large mercury vapor background. Since the instrument measures the amount of unknown gas by the amount of mercury vapor produced as a result of the oxidation in the mercuric oxide cell, it will be appreciated that the excess mercury vapor severely limits the sensitivity of the device. The high mercury vapor concentration is impractical in optical cell systems as it is extremely difficult to prevent mercury condensation on the condensers.

An object of this invention is the provision of apparatus of the type indicated which has an improved accuracy and sensitivity for measuring small concentrations of the desired gas in a sample.

Yet another object of the present invention is the provision of a novel and improved structure for a carbon monoxide detector.

Yet another object of the present invention is the provision of apparatus of the type indicated wherein there is an improved mercuric oxide cell.

Still another object of the present invention is the provision of apparatus of the type indicated which can operate at a higher rate of speed and with a higher sensitivity than other devices of this type.

These and other objects of the present invention are achieved by not only providing an improved design for the mercuric oxide cell in which oxidation occurs, but also by maintaining the cell under such conditions that a very low mercury vapor background is present whereby the sensitivity of the apparatus is greatly increased. The mercury oxide cell through which the air is passed is made of a stainless steel container within which a disc of red mercuric oxide powder is supported between two pads of glass wool. The cell is maintained at a temperature of 210° ±15° centigrade, which would produce about 2% by volume of mercury vapor at thermal equilibrium, yet because of the unique design and operating conditions of this system the pseudo-steady state concentration at mercury vapor in the air stream from thermal dissocation is less than one part per million.

Figure 2:
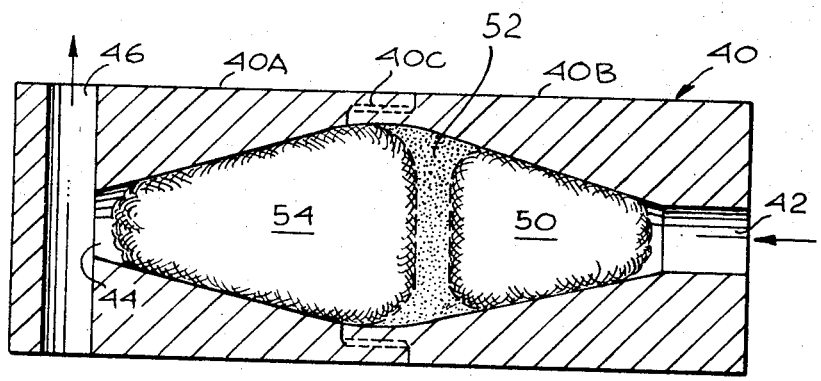

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a schematic diagram of a carbon monoxide detector embodying the structure of this invention; and FIGURE 2 is a cross-sectional view of a mercury oxide cell in accordance with this invention.

Reference is now made to FIGURE 1 which is a schematic diagram of a carbon monoxide detector in accordance with this invention. Air, which is drawn into the apparatus and which is to be analyzed first passes through a dehydrating column 10. Thereafter it can have one of two paths. One of these, when an air sample valve 12 is opened and a reference air valve 14 is closed, is through an air flow meter 16. The other of these paths, when the air sample valve 12 is closed and the reference air valve 14 is opened, is through a cell 18 containing an oxidizer, such as silver oxide and thereafter through the air flow meter 16. The air passing through the air flow meter then passes through a preheater 20 which heats it to a temperature on the order of 210° C., and then through the mercury oxide cell 22, also operated at this temperature. Thereafter the gas passes through an ultraviolet photometer 24 which detects the amount of mercury vapor present, which may be indicated on a meter 26 and/or on a recorder 28. The exhaust pump 30 serves to pull the gas through the entire apparatus. Also connected to the system before the preheater 20 is a container 32 of calibration gas which for carbon monoxide can contain 100 p.p.m. CO in high purity $N_2$. The container 32 is connected to a valve 34 to a flow meter 36. The flow meter is then connected through a calibration valve 38 to the tubing leading to the preheater 20.

The mercury oxide cell in accordance with this invention is shown in FIGURE 2, which comprises a cross-sectional view of the cell. The cell consists of a stainless steel cylinder 40, which is made of two pieces respectively 40A, 40B, which threadably engage one another as by the threaded region 40C. The center of the cylinder 40 is hollow and expands from the inlet opening 42 to a maximum diameter substantially at the threaded region 40C and thereafter reduces in diameter to an exit region 44. The end of the opening 44 abuts a right angle passage 46 through the cylinder 40, and exits into the photometer through this passage 46.

The cell contains two wads of a heat resistance porous material 50, such as Pyrex wool, which fill both conical sections of the cell between openings 42 and 44 except for the volume occupied by the mercuric oxide. The purpose of the porous material is to support and compress the disc of red mercuric oxide and at the same time distribute the incoming air over the whole disc area. The cell is simply loaded by first being unscrewed, a wad of Pyrex wool being pushed thereinto and then the mercuric oxide powder is loaded on top of the Pyrex wool. A wad of Pyrex wool is then pushed into the other half of the cylinder which is then threaded closed compressing the disc of mercuric oxide and giving it dimensional stability.

In seeking to improve the sensitivity of the carbon monoxide analyzer embodied by this invention, it was found that one of the greatest problems that had to be overcome was the presence of a large amount of mercury vapor which was produced by the mercury oxide cell as the result of thermal dissociation of the mercury oxide when it was operated at thermal equilibrium at the minimum temperature at which the oxidiation reduction reaction proceeds rapidly. This had been found to be 165° C. At thermal equilibrium, a very large mercury vapor background (on the order of 2500 p.p.m.), was present which was carried by the gas into the photometer, thereby serving to mask small quantities of mercury vapor produced by reduction of any carbon monoxide present in the sample. It was found that when the nonequilibrium mercury oxide cell was operated at a temperature of 210° C., with a sample residence time in the mercuric oxide disc of 1.5 msec. not only was the mercury vapor background in the optical cell reduced by 4 orders of magnitude (to approximately 0.5 p.p.m. Hg), but also, the short exposure time of the gaseous reactant to the hot mercury oxide was sufficient for complete reaction of the carbon monoxide and during the short exposure period, the gas stream passing through the mercury oxide bed acquired a very stable background mercury vapor concentration.

By way of illustration, but not by way of a limitation upon the invention, the optimum conditions and dimensions for the cell were, air flow 1 to 2 liters per minute, mercury oxide cell temperature 210° C., with the air stream also preheated to 210° C.; and a 3 gram mercury oxide bed in the form of a thin disc 0.2 centimeter thick and 2 centimeters in diameter. The bed was pure red mercury oxide powder and was held in place by the glass wool pads in the stainless steel cell shown in FIGURE 2. The pressure drop through the cell is only about 4 inches of water. The residence time of the air in the mercuric oxide disc is 1.5 msec. at 1 liter per minute air flow.

A surprising aspect of this set of conditions is the extremely low concentration of mercury vapor present, due to thermal dissociation. At 210° C., the equilibrium dissociation pressure of the mercury vapor is about 20,000 p.p.m. Yet under the mass flow and resistance time described above, the mercury vapor concentration of the air leaving the mercuric oxide cell is only a few tenths of a part per million.

The oxidation and interference reactions of various gases which are found in the p.p.m. concentration range in the atmosphere were investigated using the mercuric oxide cell at 210° C. with 1.5 msec. air sample reaction time. Methane ($CH_4$) and hydrogen ($H_2$) are always found in unpolluted air at concentrations of greater than 1.0 p.p.m. for methane and about 0.5 p.p.m. for hydrogen. These two components are the only reducing gases present in unpolluted atmospheres and concentrations sufficiently high for them to be major potential interferences to CO determinations. However, the assessment of the responsive mercuric oxide detector cell to other kinds of compounds, particularly ethylene, formaldehyde, acetone, sulfur dioxide, nitrogen dioxide, and water vapor was necessary and important as all these gases are present in the atmosphere at significant and varying concentrations under special conditions. Synthetic mixtures of the various components in air, which were passed through the HgO cell at 210° C. with 1.5 msec. reaction time, showed the following behavior:

(1) CO was oxidized to $CO_2$ quantitatively, i.e.,

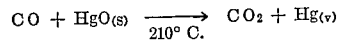

$$CO + HgO_{(s)} \xrightarrow[210° C.]{} CO_2 + Hg_{(v)}$$

(2) The methane oxidation rate at a $CH_4$ concentration of 2 p.p.m. was so slow that no reaction was noted. Therefore, the method is blind to $CH_4$ at these concentrations and there is no $CH_4$ interference.

(3) Hydrogen was oxidized to the extent of about 6 mole percent, $$16H_2 + HgO_{(s)} \xrightarrow[210° C.]{} H_2O + Hg_{(v)} + 15H_2 + 15HgO_{(s)}$$

(4) Ethylene was oxidized quantitatively to $CO_2$ and $H_2O$ and was equivalent to 6 moles of CO per mole $CH_2=CH_2$, $$CH_2=CH_2 + 6HgO_{(s)} \xrightarrow[210° C.]{} 2CO_2 + 2H_2O + 6Hg_{(v)}$$

(5) Formaldehyde was oxidized quantitatively to $CO_2$ and $H_2O$ and gave 2 CO equivalents per mole, $$HCHO + 2HgO_{(s)} \xrightarrow[210° C.]{} CO_2 + H_2O + 2Hg_{(v)}$$

(6) Acetone was not oxidized quantitatively but had a CO equivalent of about 4 rather than 8. It might be speculated that the reaction would be similar to the following:

$$CH_3COCH_3 + 4HgO_{(s)} \xrightarrow[210° C.]{} 2CO_2 + H_2O + CH_4(?) + 4Hg_{(v)}$$

where the $CH_4$ in the equation represents methane type (paraffinic) oxidation, shown above to be shown in the $CH_4$ case.

(7) Sulfur dioxide at 1 to 2 p.p.m. concentration shows no reaction with the HgO.

(8) Nitrogen dioxide at 1 to 2 p.p.m. concentration shows no reaction with the HgO.

(9) Water vapor interference: production of Hg vapor in the HgO cell was found to be affected by changes in water vapor concentration. It was determined, as is often observed when checking sensitive detectors, that the hot HgO cell was, in fact, a good, linearly quantitative humidity detector. As such it had about a 1 p.p.m. equivalent CO concentration range from 0 to 100% relative humidity at room temperature. To eliminate this influence it was necessary to add an air drying cell, 10, to the CO detecting system. Oridinary 8-mesh Drierite (anhydrous calcium sulfate) in a bed 4 cm. in diameter, 20 cm. deep was found to have a negligible effect on low CO (0.1 p.p.m.) concentrations, yet if effectively dried the 1-liter/min. air stream and permitted operation of the detector independently of humidity. A cell such as this would last for 6 to 12 hours of operating time, depending on the ambient humidity.

Of the trace component effects and reactions in the hot HgO cell, the partial oxidation of hydrogen was the one which had to be eliminated to provide a workable atmospheric CO detection system. The hydrogen oxidation contribution to the Hg vapor concentration was cancelled by the addition of a cell 18 to the system, containing granular silver oxide ($Ag_2O$) at room temperature, ahead of the HgO cell. The $Ag_2O$ quantitatively oxidized CO, HCHO, and $CH_2=CH_2$, but did not oxidize $H_2$ or $CH_4$ if both the $Ag_2O$ and the air stream were moisture free. When sample air passes through this pre-oxidation cell, a reference zero CO level of Hg vapor is obtained; when the pre-oxidation cell is by-passed, the CO equivalent of the active reducing gases is measured by the increase in Hg vapor concentration. Thus, in operation it is possible to include the 6% $H_2$ oxidation contribution in the background Hg vapor along with the thermal Hg vapor, and $H_2$ interference is eliminated in atmospheric samples. Of course, rapid and large changes in $H_2$ concentration would tend to upset this baseline procedure, but there is no evidence that significant changes in $H_2$ occur in the normal atmosphere.

In summarization, the recommended method of operation of the system shown in FIGURE 1 is as follows. First, the reference baseline is established. This is done by passing sample air through the dryer 10 and through the $Ag_2O$ cell 18, through the flow meter 16, and into the preheater 20 and the hot mercuric oxide cell 22. Next, the system is calibrated. This is done by metering, using the calibration flow meter 36, a known concentration of the CO gas in the container 32 into a reference sample stream of air which has passed through the dryer 10 and through the $Ag_2O$ cell 18 before the calibration gas is added. The sample rate of air is measured by the air flow meter 16. Two or three known concentrations of the CO are metered into the reference air in this manner to provide calibration over a range of CO concentration levels. Thereafter, the reference air valve 14 is closed as is the calibration valve 38 and valve 34 and the air valve sample 12 is opened to permit the intake of a known quantity of the air the CO contents of which is to be measured. The air flow meter 16 is used for this purpose.

There has been accordingly described and shown herein a novel, useful and improved apparatus for continuously detecting and analyzing the presence of carbon monoxide which is mixed with other gases by passing said mixture of gases through a heated mercuric oxide cell whereby there is produced carbon dioxide and mercury vapor, and the concentration of the mercury vapor is measured to indicate the amount of carbon monoxide which is present on a continuous basis.

What is claimed is:

1. In a carbon monoxide detector of the type wherein an air sample is passed through a mercuric oxide cell to produce mercury vapor, a measurement of which continuously indicates the amount of carbon monoxide, the improvement in said mercuric oxide cell comprising walls forming a chamber through which said mixture of gases are passed, said chamber being filled with two glass wool pads separated by a layer of red mercuric oxide powder having a predetermined thickness.

2. The improvement as recited in claim 1 wherein there is included heater means for maintaining said mercuric oxide powder at a temperature on the order of 210° C.

3. Apparatus as recited in claim 1 wherein said glass wool is Pyrex wool and said walls are made of stainless steel.

4. A carbon monoxide detector comprising a source of a gas containing carbon monoxide desired to be continuously detected and measured, mercuric oxide cell means for oxidizing carbon monoxide passed therethrough to produce mercury vapor, the concentration of which is quantitatively indicative of the concentration of carbon monoxide, and means for passing gas from said source through said mercuric oxide cell means including dehydrating means having an input and an output, means for applying gas from said source to said dehydrating means input to be dehydrated, first path means including a first valve means for coupling gas from said dehydrating means output to said mercuric oxide cell means, second path means including second valve means and silver oxide cell means for coupling gas from said dehydrating means output to said mercuric oxide cell means when said first valve means is closed and said second valve means is opened, and means for detecting the concentration of the mercury vapor produced by said mercuric oxide cell means.

5. Apparatus as recited in claim 4 wherein said mercuric oxide cell means comprises walls forming a cavity, said cavity having an input opening and an output opening, a first pad of glass wool filling a portion of said cavity from said input opening toward its center, a disc of red mercuric oxide powder supported and pressed into place, filling a portion of said cavity adjacent said first glass wool pad, and a second glass wool pad extending between said mercuric oxide and said output opening and filling the remainder of said cavity.

6. Apparatus as recited in claim 4 including means for maintaining said mercuric oxide means at a temperature of 210° C.

7. In apparatus wherein carbon monoxide in a mixture of gases is to be continuously detected and measured by passing said mixture of gases through a heated mercuric oxide cell and thereafter detecting the density of the mercury vapor produced as a result of said oxidation, the method comprising heating said mercuric oxide cell to a temperature on the order of 210° C., and passing said mixture of gases through said cell at a rate to produce a 1.5 millisecond reaction time.

8. In apparatus wherein it is desired to detect and measure the quantity of carbon monoxide in a mixture of gases by passing said carbon monoxide through a mercuric oxide cell which produces by oxidation mercury vapor a continuous measurement of the concentration of which indicates the amount of carbon monoxide present, the improvement in calibrating said apparatus for a zero carbon monoxide reading comprising passing a sample of said mixture of gases through an oxidizing cell for oxidizing said carbon monoxide without producing mercury vapor, passing the resultant gases through said mercuric oxide cell, and measuring the density of the mercury vapor present in the output from said mercuric oxide cell.

9. Apparatus as recited in claim 8 wherein said oxidizing cell for oxidizing said carbon monoxide without producing mercury vapor contains silver oxide ($AgO_2$).

References Cited

UNITED STATES PATENTS 3,112,999   12/1963   Grosskopf _____ 23—254

OTHER REFERENCES

Minchin: "Field Tests for the Detection of Carbon Monoxide," Chemistry and Industry, March (1948), pp. 147–149.

MORRIS O. WOLK, *Primary Examiner.*

R. E. SERWIN, *Assistant Examiner.*

U.S. Cl. X.R.

23—232